United States Patent [19]
Lorenzana et al.

[11] Patent Number: 5,488,927
[45] Date of Patent: Feb. 6, 1996

[54] ANIMAL FOOD DISH AND WATER DISPENSER

[76] Inventors: Moises B. Lorenzana, 601 Lake Hinsdale Dr., Willowbrook, Ill. 60514; Vance A. Lorenzana, 73 Chippewa Dr., Osewego, Ill. 60543

[21] Appl. No.: 343,024

[22] Filed: Nov. 21, 1994

[51] Int. Cl.⁶ ................................................. A01K 39/00
[52] U.S. Cl. ................................................. 119/51.5
[58] Field of Search .......................... 119/51.5, 52.1, 119/53, 53.5, 54, 77

[56] References Cited

U.S. PATENT DOCUMENTS

| | | | |
|---|---|---|---|
| D. 296,371 | 6/1988 | Lorenzana et al. | D30/122 |
| 2,555,396 | 6/1951 | Cosner . | |
| 3,720,184 | 3/1973 | Pearce . | |
| 3,730,141 | 5/1973 | Manning et al. . | |
| 4,532,891 | 8/1985 | Jones . | |
| 4,573,434 | 3/1986 | Gardner | 119/77 |
| 4,800,845 | 1/1989 | Budd | 119/61 |
| 4,840,143 | 6/1989 | Simon | 119/51.5 |
| 5,259,336 | 11/1993 | Clark | 119/51.5 |

FOREIGN PATENT DOCUMENTS 2363281  5/1978  France ......................... 119/51.5

*Primary Examiner*—Thomas Price
*Attorney, Agent, or Firm*—Neil M. Rose

[57] ABSTRACT

An animal food dish and water dispenser which includes first and second cup shaped receptacles spaced apart in a base member having an upwardly projecting barrier separating the two receptacles and supporting an inverted water reservoir bottle centrally on the base member to supply water to one of the receptacles.

10 Claims, 2 Drawing Sheets

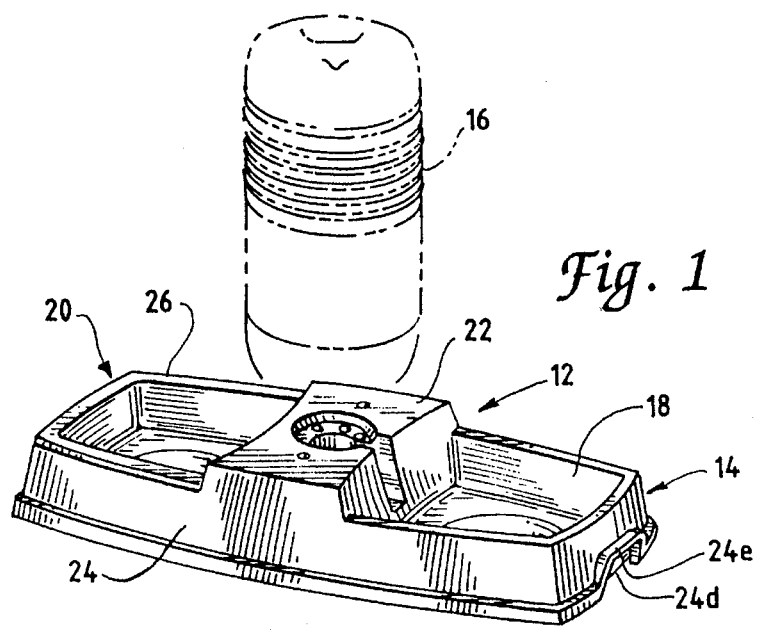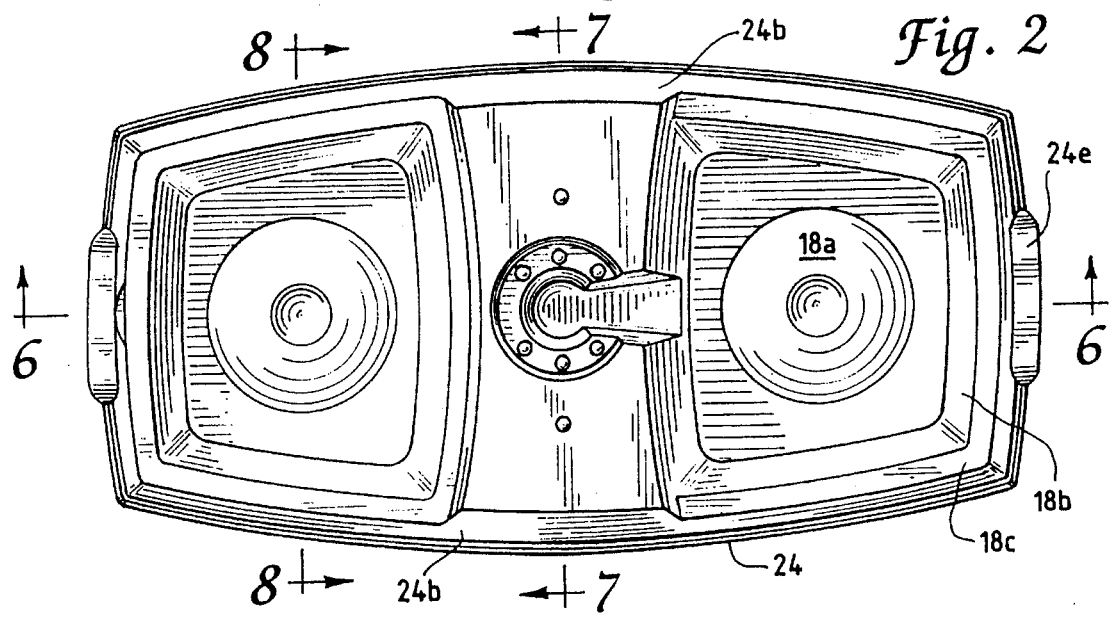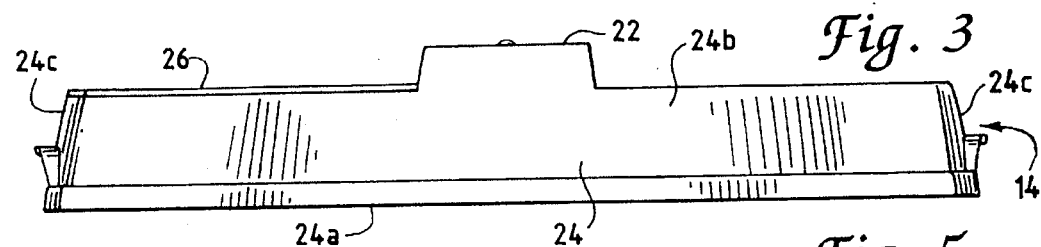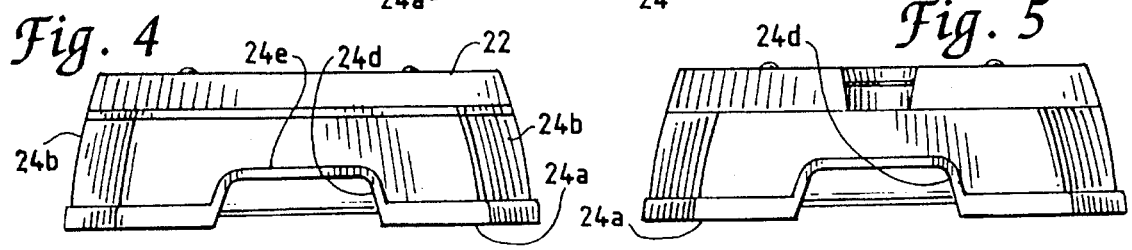

ANIMAL FOOD DISH AND WATER DISPENSER

BACKGROUND OF THE INVENTION

1. Field of the Invention

The present invention relates generally to apparatus for supplying food and water to domestic pets or animals, and more specifically, it relates to a device having a food receptacle and a water receptacle with a reservoir for supplying water continuously to the water receptacle.

2. Description of the Prior Art

In connection with the feeding domestic animals, it has been common to utilize combination food and water bowls. These articles typically include two closely spaced bowls or receptacles that are intended to receive the pet food and water. The advantage attributed to these combination bowls is that it is easier for the pet owner to handle the unitary article having both the water and the food receptacle rather than having to fill and transport two separate bowls from the preparation area to the location at which the pet consumes the food and water. There are many variations in the size and shape of such devices with such variations being at least partially attributable to the needs of the various types of domestic animals involved. Small cats have much different requirements than large dogs for example.

There are a number of features which have been developed and used in such pet food and watering devices. Perhaps most significant of these is the use of reservoirs to supply a substantial volume of water continuously to the water receptacle. This feature allows the pet to be left alone and unattended for a longer period of time. Examples in the prior art of such reservoir equipped food and watering devices are shown in U.S. Pat. No. 4,573,434 to Gardner, U.S. Pat. No. 3,730,141 to Manning et al, U.S. Pat. No. 4,840,143 to Simon, U.S. Pat. No. 3,720,184 to Pearce and U.S. Pat. No. D 296,371 to Lorenzana et al. All of these patents disclose devices using reservoirs, some being inverted bottles, to dispense water and, in some instances food to receptacles from which the animal may consume the food or water. The mouth of the reservoir is positioned at an appropriate level to provide a constant water or food level in the receptacle so that the animal may conveniently consume the receptacle contents with the reservoir continuing to supply until its contents are exhausted.

In a number of the prior art patents noted above, the reservoir comprises an inverted soft drink or soda bottle of the type readily available to the domestic pet owner. These bottles are one or two liter plastic bottles in which most commercially available soft drinks are sold. The plastic bottles are sufficiently rigid and have threaded necks so that they may be easily supported on the food and watering device by threadedly engaging the neck of the inverted bottle into a threaded recess in the device.

Another useful feature common to some of the prior art food and watering devices involves the use of detachable or separable receptacles for the food containing portion of the device. This feature is attractive for several reasons. First, it allows the food container to be washed separately from the other portions which have much less tendency to require washing as they are not in contact with the food. Secondly, it is convenient to fill the food container separately from the waterer since it must usually be done more frequently. In addition, in some instances the separable inserts for the food receptacle are designed to be disposeable as shown in U.S. Pat. No. 4,800,845 to Budd. Other examples of separable dishes shown in prior art patents are the U.S. Pat. Nos. to Jones No. 4,532,891 and Cosner No. 2,555,396.

SUMMARY OF THE INVENTION

The animal food dish and waterer of the present invention includes a pair of adjacent food and water receiving receptacles on an elongated base member with a reservoir for supplying water continuously to the water receptacle being mounted on the base member between the two receptacles. The base member is provided with a plateau portion which extends across between the two receptacles to form an elevated barrier to prevent or limit the commingling of the contents of the two receptacles. The reservoir itself being positioned between the two receptacles cooperates with the barrier to limit an animal's movement directly across between the two receptacles in such a way that it might transfer the food to the water receptacle or the water to the food receptacle. Thus, the elevated barrier and the reservoir comprising an inverted plastic bottle combine to force an animal using the device to take a relatively circuitous route rather than directly between the two receptacles in such a way that it would be likely to commingle the contents of the receptacles.

The base member is formed with peripherally extending sidewalls which terminate in lower surface engaging edges disposed in a common horizontal plane. These lower edges are interrupted at either end of the base member by openings or notches which provide finger receiving openings to facilitate picking up the device from the floor or any horizontal surface. The sidewalls are connected at their upper edges by lip portions to the two spaced receptcales, the lip portions defining a common horizontal plane position below the top of the plateau portion.

The top of the plateau portion is formed with an upwardly facing recess which is formed to receive the neck of an inverted plastic bottle having threads to threadedly engage and secure the neck of the plastic bottle to the base member. The device is designed to mount a standard plastic soft drink or soda bottle of the one or two liter size. Preferably the transverse barrier or plateau is on the order of three incles wide which is substantially equal to the diameter of the one liter soft drink bottle. However, it is also contemplated that the two liter bottle which is about four incles in diameter might also be employed if the added reservoir capacity was desired. The four inch diameter bottle would overhang the two receptacles but would not significantly interfere with an animal's access to the contents of the receptacles. An open channel is provided in the barrier to interconnect the bottle receiving recess to the water receptacle. With this arrangement the contents of the bottle flows from the mouth of the bottle into the recess, into the channel and into the water receptacle. With the bottle secured in the recess, the mouth of the bottle, which determines the level of the water is at a height above the bottom of the water receptacle to provide the desired depth of water for the animal to drink conveniently.

The bottle receiving recess is centrally located between the lengthwise extending sidewalls and between the transversely extending end walls. This location of the recess places the reservoir bottle exactly at the center when viewed from above so that the mass of the bottle has the maximum stabilizing effect on the device. Since food and watering devices of the type with which this invention is concerned are typically formed of light plastic material, they have a tendency to tip or upset when used by a active animal. By positioning the mass of the reservoir bottle over the middle of the base member, the reservoir provides added stability to the device and reduces the tendency for it to be tipped or upset. The central positioning of the reservoir bottle makes it possible to transport the device with the filled bottle assembled to the device using the handles provided at both ends of the device.

The food receptacle of the base member is provided with an insert having a lip, sidewalls and a bottom which conform in configuration to the walls of the receptacle. The insert is detachable or separable from the use position assembled to the base member so that it may be filled with food or washed separate from the device itself. A convenient finger notch is provided in the transverse sidewall of the base member to facilitate detaching the insert from its position in the base member.

Accordingly, it is an object of the present invention to provide an improved food dish and waterer for domestic animals which includes means for preventing the food and water from being mixed together by the animal using the device.

It is a further object of the present invention to provide an improved food dish and water dispenser which includes food and water receptacles separated by a barrier including an elevated water reservoir.

It is another object of the present invention to provide an improved food dish and water dispenser which includes a water reservoir for supplying water continuously to a water receptacle and has the reservoir positioned centrally in such dish and dispenser to stalbalize the device and to prevent commingling of food and water dispensed.

It is another object of the present invention to provide an improved food dish and water dispenser in which the water reservoir is centrally located between handles at opposite ends so that the device may be transported in a level and stable condition even when the reservoir is filled.

Additional objects and advantages of the invention will beome apparent as the following detailed description of the preferred embodiment is read in conjunction with the accompanying drawings which illustrate such preferred embodiment.

BRIEF DESCRIPTION OF THE DRAWINGS

FIG. 1 is a perspective view of an animal food dish and water dispenser embodying the present invention with a reservoir bottle shown in broken lines for illustration purposes FIG. 2 is a top plan view of the dish and water dispenser of FIG. 1.

FIG. 3 is a front elevational view of the dish and water dispenser of FIG. 1

FIG. 4 is a right end elevational view of the dish and water dispenser of FIGS. 1–3.

FIG. 5 is a left end elevational view of the dish and water dispenser of FIGS. 1–4.

DESCRIPTION OF THE PREFERRED EMBODIMENT

Figure 6:
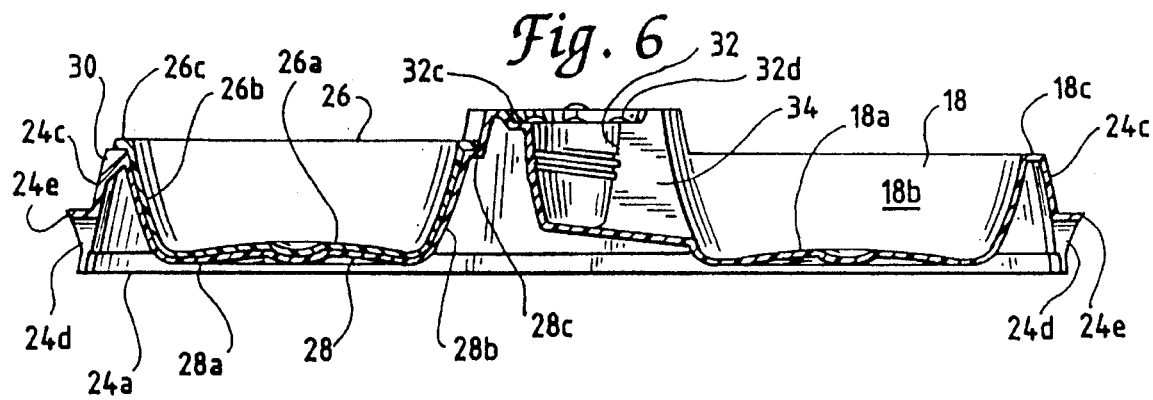
FIG. 6 is a sectional view taken on line 6—6 of FIG. 2.
Figure 7:
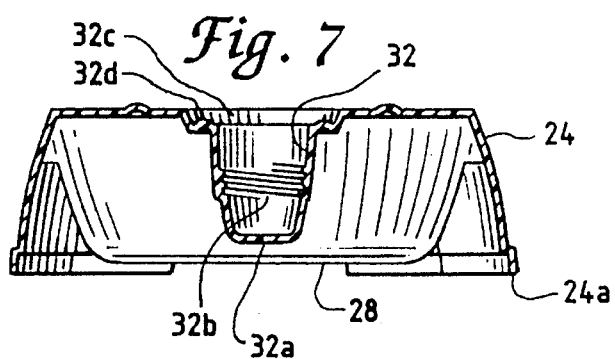
FIG. 7 is a sectional view taken on line 7—7 of FIG. 2

Referring now to the drawings, the animal food dish and water dispenser of the present invention is designated generally by reference numeral 12. The food dish and water dispenser 12 includes a base member 14 which is adapted to support a water reservoir 16 which is shown in broken lines in FIG. 1 only.. As will be explained in detail below, the reservoir 16 preferably comprises a plastic soft drink bottle which is mounted in an inverted position on the base member 14 to supply water continuously over a period of time.

The base member 14 includes a water receptacle 18 and a food receptacle 20 positioned at opposite ends and separated by a plateau portion 22 which extends across the middle portion of the base member 14. Supporting the base member 14 are sidewalls 24 which slope outwardly and terminate at lower edges 24a. The lower edges 24a are disposed in a common horizontal plane and are adapted for engagement with a supporting surface. The sidewalls 24 include lengthwise extending walls 24b and transversely extending end walls 24c. As is evident from FIG. 2 the lengthwise walls 24b and the end walls 24c are curved slightly but define a generally rectangular area in which the food and water receptacles 20 and 18 respectively are positioned. The end walls 24c are formed with notches or interruptions 24d which extend upwardly from the edges 24a and terminate in handle portions 24e. When it is necessary to move the food dish and water dispenser 12 from one location to another, the notches 24d facilitate inserting the fingers beneath the handle portions 24e so that the dish and dispenser may be easily lifted from a horizontal surface.

Figure 8:
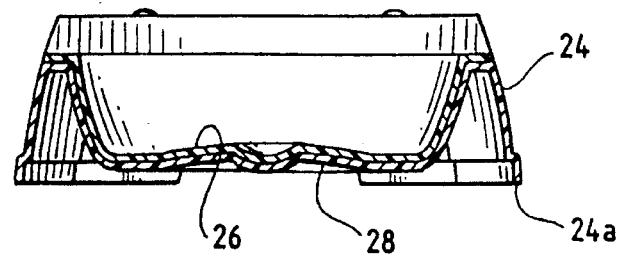
FIG. 8 is a sectional view taken on line 8—8 of FIG. 2

As indicated above, the food receptacle 20 and the water receptacle 18 are disposed on opposite sides of the plateau portion 22. The food receptacle 20 is provided with a removable insert which conforms to the size and contour of a dish portion 28 which is integrally molded as a part of the base member. The dish portion 28 is of generally cup shaped configuration having a bottom 28a and upwardly extending walls 28b which terminate in a lip 28c which joins the dish portion 28 to the base member side walls 24. On the side of the dish portion 28 adjacent the plateau portion 22, the lip 28c is connected to the plateau portion across its transversely extending length. The insert 26 in its assembled position conforms to the contour of the dish portion 28, having a bottom wall 26a, an upwardly extending wall 26b and a peripheral lip 26c as is best shown in FIGS. 6 and 8. As shown in FIG. 6, the end wall 24c is formed with a central cut-out 30 which allows one to insert a finger beneath the lip 26c in order to separate the insert 26 from the base member 14. The purpose of the insert 26 is to permit the filling of the food dish 20 at a location remote from the base member 14 such as at the kitchen counter close to the source of the food being dispensed into the dish and water dispenser 12. In view of the fact that the food normally requires replenishment more frequently than the water, the use of the separable insert dish simplifies the refilling process considerably. In addition, the separable dish permits the insert 26 to be easily washed without washing the entire device. The insert 26 is preferably formed of a rigid and durable plastic which may be washed in an automatic dishwasher.

The water receptacle 18 is similar in configuration to the food receptacle 20 but requires no insert because it need not be refilled frequently and seldom needs to be washed. The water receptacle includes a bottom 18a, upwardly extending walls 18b and a lip 18c which joins the water receptacle to the upper edges of the sidewall 24 on three sides. On the forth side, the wall 18b connects smoothly into the wall of the plateau portion 22.

As indicated above the bottle or reservoir 16 comprises an inverted plastic bottle of the type conventionally used for soda or soft drinks sold commercially in one or two liter bottles. These bottles are readily available and need not be included as a part of the present invention as distributed commercially. Since the bottles are very bulky, the omission of the bottle from the dish and dispenser as sold permits the product to be sold in a much more compact package than would otherwise be required. To mount the bottle or reservoir 16, the plateau portion 22 of the base member 14 is formed with a centrally disposed recess 32 which includes a bottom 32a a cylindrical threaded wall 32b and a shallow circular depression 32c. The bottle 16 is inverted to an upended vertical position with the neck extending into the recess 32, and then the bottle is rotated to engage the threads on the bottle with the threads on the recess. When completly engaged with the threads in the recess, the mouth of the bottle 16 is spaced above the bottom 32a of the recess thus permitting water in the bottle to discharge into the recess 32. With the bottle 16 assembled as described above, the conventional bottle includes a neck flange which engages in the circular depression 32c to stabilize the bottle mounting. A plurality of protuberances 32d are formed in the circular recess 32 to engage the neck flange on the bottle and prevent the bottle from becoming tightly engaged with the base member 14 so that it would be difficult to disassemble the bottle 16 for refilling.

For the purpose of allowing the water in the recess 32 to flow outwardly into the water receptacle 18, the wall 18b and the plateau portion 22 are formed with an upwardly facing channel or passageway 34 which permits the water to flow generally horizontally to the right as shown in FIG. 6. Since the level of the water in the receptacle 18 is determined by the position of the mouth of the bottle 16 and the mouth is positioned above the bottom 32a of the recess 32, the recess is dimensioned so that the water level will preferably be about half way between the bottom 18a and the lip 18c. This depth is sufficient for an animal to drink comfortably while maintaining enough wall height above the water level to limit the spillage or splashing by the animal.

One of the important advantages produced by the use of the reservoir bottle 16 is that the water level may be maintained constant at an optimum level. In the conventional water receptacle that must be periodically refilled, the level varies from full at the outset to almost nothing as it becomes exhausted. Thus there is danger of spillage initially, and in the later stages, the water level will often be too shallow for the animal to drink comfortably. Because of the feature of being able to maintain a constant level during the entire period in which the one or two liters of water contained in the bottle are being consumed, the water receptacle may be designed to be much shallower. This aspect is very important in designing a food dish and water dispenser that would be suitable for small animals such as cats including kittens and the like. In a preferred embodiment designed specifically for such small animals, the sidewalls 24 were slightly less than one and a half inches in height and the depth of the receptacles was on the order of one and one quarter inches. Such an arrangement allows access to the food and water by very small animals.

The recess 32 is located equidistant between the lengthwise extending sidewalls 24b and equidistant between the end walls 24c. As a consequence, the center of mass of the bottle 16 is located over the center of the base member 14. With such location of the mass of the bottle and its contents, the overall stability of the food dish and water dispenser in increased considerably over the stability it would have if the bottle were located elsewhere or not employed at all. The prior art devices including such food or water reservoirs had them located offset so as to adversely affect the stability. This lack of stability is particularly important when attempting to transport one of these devices when the reservoir bottle is filled. The offset position of the filled reservoir has a serious tendency to destabalize the device. However, by having the reservoir located midway between the handles 24e, the device of the present invention may be transported easily in a level and stable position.

The other advantage resulting from the central location of the bottle is its use as a barrier between the two receptacles. The plateau portion 22 forms a partial barrier since it extends above the level of the lips of the water and food receptacles and would be useful in preventing an animal from mixing or commingling the contents of the two receptacles. It is known that domestic animals often eat and drink in a fashion that causes the water and food contained in adjacent vessels to be mixed together in an undesireable manner. The placement of the water bottle 16 between the receptacles has the advantage of providing almost a complete barrier to the mixing of the contents of the two receptacles. In a preferred embodiment of the invention the average width of the receptacles was on the order of four inches while the diameter of the two liter plastic soft drink bottle is on the order of four inches. Accordingly, an animal moving between the two receptacles would have to move around the bottle and outside the confines of the sidewalls thereby substantially eliminating the possibility of an animal transferring water or food between the two receptacles. While the one liter bottle is only three inches in diameter, it also provides sufficient obstruction that food or water transfer between the two receptacles is very unlikely.

From the foregoing description of the preferred embodiment, it should be evident that the present invenion provides an improved food dish and water dispenser particularly suited for small domestic animals. The centrally disposed water reservoir produces increased stability and guarantees against mixing or commingling of the food and water contained in the device.

What is claimed as new and desired to be secured by Letters Patent of the United States is:

1. Animal food dish and water dispenser of a type which utilizes an inverted bottle as a reservoir to provide a continuing flow of water to an open container from which domestic animals may drink comprising:

an elongated base member having a centrally disposed plateau portion, said base member being formed with a first and a second cup shaped receptacles with said plateau portion being between said receptacles and projecting upwardly above said receptacles to form an elevated barrier extending across said base member between said receptacles to prevent any liquid or solid material placed in said receptacles from being commingled, said plateau portion being formed with an upwardly facing recess having internal threads to receive and support an inverted plastic bottle to deliver water to said recess, said base member being formed with a channel extending from said recess to said first receptacle to supply water from said recess to said first receptacle.

2. The animal food dish and water dispenser of claim 1 wherein said base member is supported by downwardly extending peripherally disposed sidewalls which terminate in surface engaging edges, said recess being centrally located in said base member to position the mass of said plastic bottle and its contents centrally with respect to said side wall edges.

3. The animal food dish and water dispenser of claim 2 wherein each of said first and second cup shaped receptacles has an upwardly facing mouth defined by a peripheral lip disposed in a horizontal plane which is below the level of said plateau portion at a height to provide access to said receptacles by small animals, said bottle providing an upward extension of said barrier to restrict an animal from commingling the contents of said receptacles.

4. The animal food dish and water dispenser of claim 3 wherein said second receptacle is provided with a removable rigid plateau liner which serves as a food dish to be filled at a point remote from said base member and then inserted into said second receptacle.

5. The animal food dish and water dispenser of claim 2 wherein said elongated base member is formed with cutouts in said surface engaging edges of said side walls to provide handles at opposite ends of said base member, said recess and said bottle mounted therein being aligned with said handles and equidistant between them.

6. The animal food dish and water dispenser of claim 1 wherein said upwardly facing threaded recess is dimensioned to receive neck of a standard one liter capacity soft drink bottle with the neck extending completely within said recess and the threads on the bottle engaging the threads in the recess to secure the bottle in a vertical upright position with respect to said base member, said transversely extending plateau portion having a width extending between said receptacles which is substantially equal to the diameter of said soft drink bottle.

7. An animal food dish and water dispenser comprising:

a base member having peripherally disposed sidewalls supporting a first and a second receptacle which are separated by a plateau portion extending across the middle of said base member, said sidewalls terminating in lower edges disposed in a single plane for engagement with a horizontal supporting surface, said sidewalls having upper edges which are connected to said receptacles by a lip which along with said plateau portion defines a mouth for each of said receptacles, said lip of both receptacles being disposed in a common horizontal plane below the plateau portion which provides a continuous barrier extending between said receptacles and extending above said horizontal plane to prevent an animal from transfering food or water between said receptacles.

8. The animal food dish and water dispenser of claim 7 wherein said plateau portion is formed with an upwardly facing recess having internal threads to receive and support an inverted plastic bottle to deliver water to said recess, said base member being formed with a channel extending from said recess to said first receptacle to supply water from said recess to said first receptacle.

9. The animal food dish and water dispenser of claim 8 wherein said base member is supported by downwardly extending peripherally disposed sidewalls which terminate in surface engaging edges, said recess being centrally located in said base member to position the mass of said plastic bottle and its contents centrally with respect to said side wall edges.

10. The animal food dish and water dispenser of claim 8 wherein said base member is supported by downwardly extending peripherally disposed sidewalls which terminate in surface engaging edges, said recess being centrally located in said base member to position the mass of said plastic bottle and its contents centrally with respect to said side wall edges, said base member being formed with cutouts in said surface engaging edges of said side walls to provide handles at opposite ends of said base member, said recess and said bottle mounted therein being aligned with said handles and equidistant between them.

* * * * *